US008923230B2

(12) United States Patent
Yamaguchi et al.

(10) Patent No.: US 8,923,230 B2
(45) Date of Patent: Dec. 30, 2014

(54) SIGNAL SEQUENCE ALLOCATING DEVICE AND SIGNAL SEQUENCE ALLOCATING METHOD

(75) Inventors: Yuuya Yamaguchi, Tokyo (JP); Tomohisa Otsuka, Tokyo (JP); Hiroo Omori, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 141 days.

(21) Appl. No.: 13/578,745

(22) PCT Filed: Jan. 24, 2011

(86) PCT No.: PCT/JP2011/051208
§ 371 (c)(1),
(2), (4) Date: Oct. 18, 2012

(87) PCT Pub. No.: WO2011/099353
PCT Pub. Date: Aug. 18, 2011

(65) Prior Publication Data
US 2013/0028208 A1   Jan. 31, 2013

(30) Foreign Application Priority Data
Feb. 12, 2010   (JP) ................................ P2010-029068
Jan. 13, 2011   (JP) ................................ P2011-005254

(51) Int. Cl.
*H04W 4/00* (2009.01)
*H04W 16/02* (2009.01)

(52) U.S. Cl.
CPC .................................... *H04W 16/02* (2013.01)
USPC ........................................................... 370/329

(58) Field of Classification Search
USPC .................... 370/203–211, 328–350
See application file for complete search history.

(56) References Cited

U.S. PATENT DOCUMENTS

| | | | |
|---|---|---|---|
| 5,586,122 A | 12/1996 | Suzuki et al. | |
| 7,821,991 B2* | 10/2010 | Iwai et al. | 370/328 |
| 7,995,614 B2* | 8/2011 | Ogawa et al. | 370/470 |
| 8,345,621 B2* | 1/2013 | Kwon et al. | 370/330 |
| 2003/0069044 A1 | 4/2003 | Yotsumoto | |
| 2008/0090580 A1 | 4/2008 | Sung et al. | |
| 2008/0318608 A1* | 12/2008 | Inoue et al. | 455/509 |

FOREIGN PATENT DOCUMENTS

| | | |
|---|---|---|
| CN | 101330321 A | 12/2008 |
| JP | 7-162940 A | 6/1995 |
| JP | 8-214360 A | 8/1996 |
| JP | 2001-177469 A | 6/2001 |

(Continued)

OTHER PUBLICATIONS

International Preliminary Report on Patentability issued Sep. 27, 2012 in PCT/JP2011/051208 filed Jan. 24, 2011.

(Continued)

*Primary Examiner* — Frank Duong
(74) *Attorney, Agent, or Firm* — Oblon, Spivak, McClelland, Maier & Neustadt, L.L.P.

(57) ABSTRACT

To efficiently and appropriately allocate signal sequences, a signal sequence allocation device includes a cell radius calculation module that calculates an area radius of an area in communication areas to which a signal sequence is to be allocated, a signal number calculation module that calculates the number of signals in a signal sequence to be allocated to a communication area based on the area radius, and a signal sequence allocation module that allocates a signal sequence to a communication area based on the number of signals.

19 Claims, 17 Drawing Sheets

(56) References Cited

FOREIGN PATENT DOCUMENTS

| JP | 2003-116178 A | 4/2003 |
|----|---------------|--------|
| JP | 2003-258702 A | 9/2003 |
| JP | 2006-333314 A | 12/2006 |
| JP | 2008-99290 A | 4/2008 |
| JP | 2008-219409 A | 9/2008 |
| JP | 2009-47538 A | 3/2009 |

OTHER PUBLICATIONS

English translation of the Written Opinion issued Feb. 15, 2011 in PCT/JP2011/051208 filed Jan. 24, 2011.

International Search Report issued Feb. 15, 2011 in PCT/JP2011/051208 filed Jan. 24, 2011.

"3$^{rd}$ Generation Partnership Project; Technical Specification Group Radio Access Network; Evolved Universal Terrestrial Radio Access (E-UTRA); Physical Channels and Modulation (Release 8)", 3GPP TS 36.211, v 8.7.0, 2009, pp. 39-43 plus cover pages.

Office Action issued May 28, 2013 in Japanese Patent Application No. 2011-005254 with English language translation.

"Zadoff-Chu sequence allocation on RACH for complexity reduction" Panasonic, NTT DoCoMo, R1-070189, 3GPP, Jan. 2007, pp. 1-4.

"Random Access Preamble L1 Parameters in E-UTRA", Texas Instruments, R1-072838, 3GPP, Jun. 2007, pp. 1-5.

Combined Chinese Office Action and Search Report issued Jul. 2, 2014 in Patent Application No. 201180009105.8 (with English language translation).

* cited by examiner

Fig.3

| BASE STATION ID | BASE STATION NAME | SECTOR NUMBER | LATITUDE/LONGITUDE | ALTITUDE (m) | TRANSMISSION FREQUENCY (KHz) | ANTENNA TYPE | ANTENNA HEIGHT (m) | DIRECTIVITY DIRECTION (°) | ELECTRICAL TILT ANGLE (°) | MECHANICAL TILT ANGLE (°) |
|---|---|---|---|---|---|---|---|---|---|---|
| 111111 | XYZ | 1 | 11,11,11/111,11,11 | 20 | 2000 | XYZ-ANT | 40 | 0 | 3 | 0 |
| ... | ... | ... | ... | ... | ... | ... | ... | ... | ... | ... |

Fig.4

| BASE STATION ID | OPEN-CLOSE /DEVICE | COVERAGE FLAG | HIGH-SPEED TRAFFIC LINE FLAG | OPTICAL INTERVAL DELAY (m) | DELAY IN DEVICE (m) |
|---|---|---|---|---|---|
| 111111 | OPEN SPACE | A | OFF | 1500 | 2000 |
| ... | ... | ... | ... | ... | ... |

Fig.5

| SIGNAL ID | COVERAGE FLAG A | COVERAGE FLAG B | ... | COVERAGE FLAG Z | HIGH-SPEED TRAFFIC LINE FLAG |
|---|---|---|---|---|---|
| 1 | 1 | 0 | ... | 0 | 0 |
| 2 | 1 | 0 | ... | 0 | 0 |
| 3 | 1 | 0 | ... | 0 | 0 |
| ... | ... | ... | ... | ... | ... |
| 25 | 1 | 0 | ... | 0 | 0 |
| 26 | M | 0 | ... | 0 | 0 |
| 27 | M | 0 | ... | 1 | ON |
| 28 | M | 0 | ... | 1 | ON |
| 29 | 0 | 1 | ... | 1 | ON |
| 30 | 0 | 1 | ... | 1 | 0 |
| ... | ... | ... | ... | ... | ... |
| 43 | 0 | 1 | ... | 0 | 0 |
| 44 | 0 | 0 | ... | 0 | 0 |
| ... | ... | ... | ... | ... | ... |
| m | 0 | 0 | ... | 1 | ON |

Fig.6

| SIGNAL ID | COVERAGE FLAG A | COVERAGE FLAG B | ... | COVERAGE FLAG Z | HIGH-SPEED TRAFFIC LINE FLAG a | HIGH-SPEED TRAFFIC LINE FLAG b | ... | HIGH-SPEED TRAFFIC LINE FLAG n |
|---|---|---|---|---|---|---|---|---|
| 1 | 1 | 0 | ... | 0 | ON | 0 | ... | 0 |
| 2 | 1 | 0 | ... | 0 | ON | 0 | ... | 0 |
| 3 | 1 | 0 | ... | 0 | ON | 0 | ... | 0 |
| ... | ... | ... | ... | ... | ... | ... | ... | ... |
| 25 | 1 | 0 | ... | 0 | ON | 0 | ... | 0 |
| 26 | M | 0 | ... | 0 | ON | 0 | ... | 0 |
| 27 | M | 0 | ... | 1 | 0 | ON | ... | 0 |
| 28 | M | 0 | ... | 1 | 0 | ON | ... | 0 |
| 29 | 0 | 1 | ... | 1 | 0 | ON | ... | 0 |
| 30 | 0 | 1 | ... | 0 | 0 | 0 | ... | 0 |
| ... | ... | ... | ... | ... | ... | ... | ... | ... |
| 43 | 0 | 1 | ... | 0 | 0 | 0 | ... | 0 |
| 44 | 0 | 0 | ... | 0 | 0 | 0 | ... | ON |
| ... | ... | ... | ... | ... | ... | ... | ... | ... |
| m | 0 | 0 | ... | 1 | 0 | 0 | ... | ON |

Fig.9

TABLE1

| 1 | 2 | 3 | 4 | 5 | 6 | 7 | 8 | 9 | 10 | 11 | 12 | 13 | 14 | 15 |
|---|---|---|---|---|---|---|---|---|----|----|----|----|----|----|
| 16 | 17 | 18 | 19 | 20 | 21 | 22 | 23 | 24 | 25 | 26 | 27 | 28 | | |

M

TABLE2

| 29 | 30 | 31 | 32 | 33 | 34 | 35 | 36 | 37 | 38 | 39 | 40 | 41 | 42 | 43 |
|----|----|----|----|----|----|----|----|----|----|----|----|----|----|----|

(a)

(b)

(a)

(b)

(a)

(b)

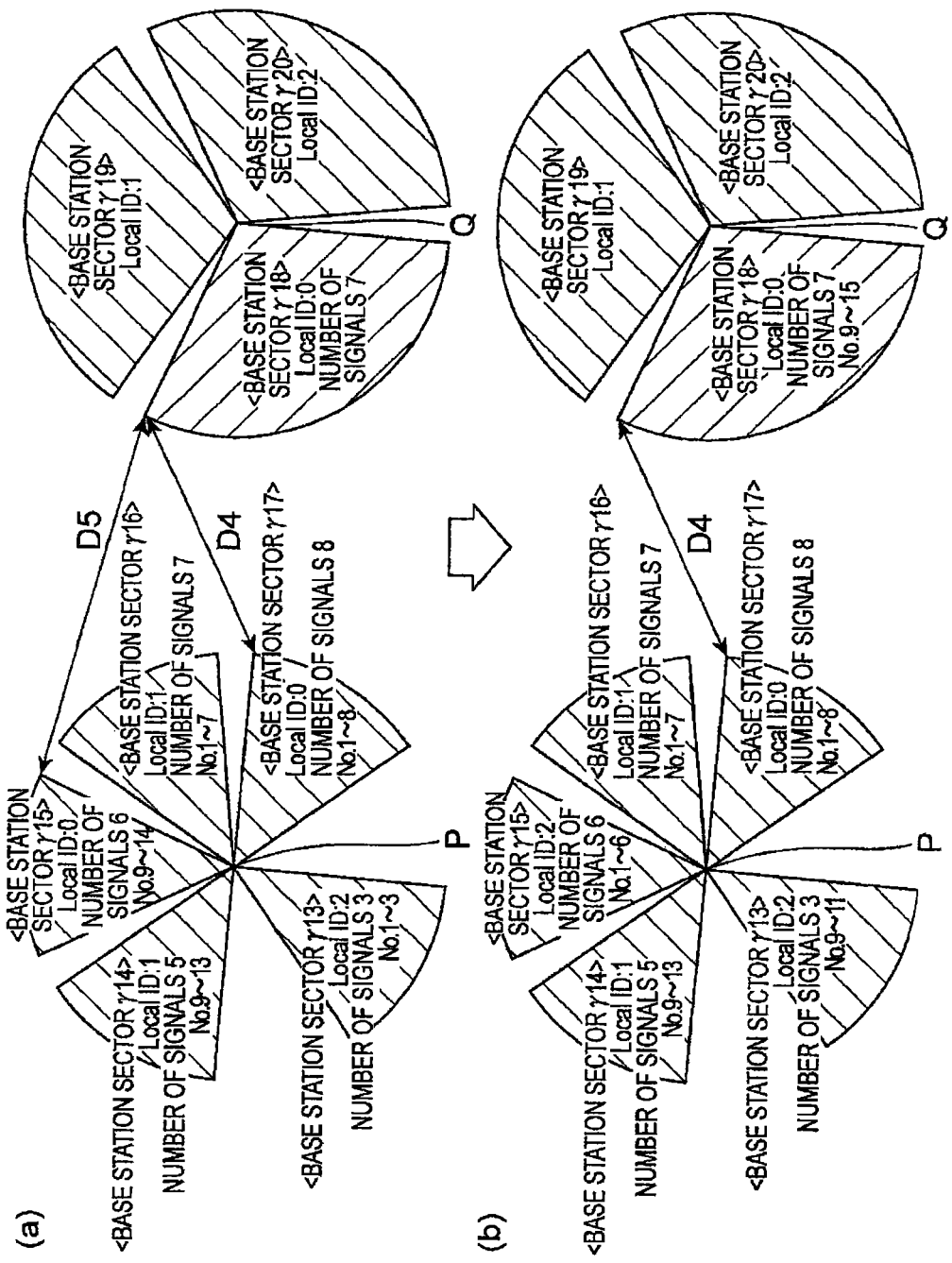

SIGNAL SEQUENCE ALLOCATING DEVICE AND SIGNAL SEQUENCE ALLOCATING METHOD

TECHNICAL FIELD

The present invention relates to a signal sequence allocating device and a signal sequence allocating method for allocating a signal sequence of random access control signals which a mobile station sends out to a base station at the start of a connection or the like.

BACKGROUND ART

In mobile communication, a mobile station sends out random access control signals to a base station at the start of a connection or the like. In LTE (Long Term Evolution), an operator needs to allocate RACH Root Sequence (which is referred to hereinafter as a signal sequence) that is a control signal sequence used at that time to each base station sector, which is a communication area of the base station. For example, Non Patent Literature 1 discloses that RACH Root Sequence is composed of 838 sequences.

CITATION LIST

Patent Literature

Non-Patent Literature 1: 3GPP (3RD Generation Partnership Project) TS36.211 V8.7.0 (5.7.2 Preamble sequence generation)

SUMMARY OF INVENTION

Technical Problem

At the time of allocating a signal sequence to each base station sector, it is necessary to allocate one or more (a plurality of) signals in the signal sequence to each base station sector in accordance with the maximum propagation distance or the like from a mobile station to a base station (the presence or absence of a high-speed traffic line in an area and a delay within a device also need to be taken into account), and it is further necessary to repeatedly allocate signals so that there is no overlap of signals with adjacent base station sectors.

However, the absolute number of signals in a signal sequence is determined, and if the minimum required number of signals to be allocated is not calculated, it can cause a lack of signals in a signal sequence. When a lack of signals occurs, the same signals are allocated again and again, which can cause the overlap of signals in adjacent base station sectors and hinders a mobile station from making a communication connection.

In light of the foregoing, an object of the present invention is to provide a signal sequence allocating device and a signal sequence allocating method that efficiently and appropriately allocate signal sequences.

Solution to Problem

To solve the above problem, a signal sequence allocating device according to the present invention is a signal sequence allocating device for allocating a signal sequence composed of one or more signals to a plurality of communication areas of a base station in a mobile communication system, which includes an area radius calculation means for calculating an area radius of an area in a communication area to which a signal sequence is to be allocated, a signal number calculation means for calculating the number of signals forming a signal sequence to be allocated to a communication area based on the area radius calculated by the area radius calculation means, and a signal sequence allocation means for allocating a signal sequence to a communication area based on the number of signals calculated by the signal number calculation means.

Further, a signal sequence allocating method according to the present invention is a signal sequence allocating method including an area radius calculation step of calculating an area radius of an area in a communication area to which a signal sequence is to be allocated by a signal sequence allocating device for allocating a signal sequence composed of one or more signals to a plurality of communication areas of a base station in a mobile communication system, a signal number calculation step of calculating the number of signals forming a signal sequence to be allocated to a communication area by the signal sequence allocating device based on the area radius calculated in the area radius calculation step, and a signal sequence allocation step of allocating a signal sequence to a communication area by the signal sequence allocating device based on the number of signals calculated in the signal number calculation step.

According to the present invention, an area radius of an area in a communication area to which a signal sequence is to be allocated is calculated, the number of signals forming a signal sequence to be allocated to a communication area is calculated based on the calculated area radius, and a signal sequence is allocated to a communication area based on the calculated number of signals. It is thereby possible to allocate the minimum required signal sequence to the area to which the signal sequence is to be allocated without excessively allocating signal sequences.

Further, in the signal sequence allocating device according to the present invention, it is preferred to further include a divided signal table selection means for selecting one divided signal table from a plurality of divided signal tables created by dividing a signal table containing allocable signals into two or more for each communication area, and when allocating a signal sequence to a communication area, the signal sequence allocation means preferably allocates a signal sequence to the communication area based on the divided signal table selected for the communication area by the divided signal table selection means and the number of signals calculated by the signal number calculation means.

According to the present invention, one divided signal table is selected for each communication area from a plurality of divided signal tables created by dividing a signal table containing allocable signals into two or more, and when allocating a signal sequence to a communication area, a signal sequence is allocated to the communication area based on the divided signal table selected for the communication area and the number of signals calculated by the signal number calculation means. It is thereby possible to allocate independent divided signal tables to the respective communication areas, thereby allowing more flexible allocation of signal sequences.

Further, in the signal sequence allocating device according to the present invention, it is preferred that the divided signal table selection means selects, for a boundary area being a communication area of a base station managed by one management area which is adjacent to a communication area of a base station managed by another management body, a divided signal table composed of signals different from signals in a signal sequence allocated to the boundary area of the base station managed by another management body.

According to the present invention, a divided signal table different from that of an adjacent boundary area of another management body is selected for a boundary area. Thus, in the case where a communication area (coverage) to which a signal sequence is to be allocated is separated for each management body, by selecting a different divided signal table for a boundary area of each coverage, there is no need to redundantly check signal sequences across coverages in the boundary areas. It is thereby possible to allocate the minimum required signal sequence to the communication area in consideration of interference with the coverage managed by another management body.

Further, in the signal sequence allocating device according to the present invention, it is preferred that the divided signal table selection means selects, for a predetermined communication area, a divided signal table different from that for peripheral communication areas.

According to the present invention, a divided signal table different from that for peripheral communication areas is selected for a predetermined communication area. For example, in a communication area (for example, on Shinkansen railway; referred to hereinafter as a high-speed traffic line), there is a possibility that a signal sequence interferes with a peripheral signal sequence due to Doppler shift and affects the connection quality. In this invention, by associating a divided signal table different from that for peripheral communication areas with a high-speed traffic line, for example, it is possible to avoid interference from peripheral signal sequences and eliminate the effect on connection quality. It is thereby possible to allocate the minimum required signal sequence to the communication area in consideration of interference with peripheral signal sequences.

Further, in the signal sequence allocating device according to the present invention, it is preferred that the area radius calculation means calculates the area radius based on a height of an antenna that transmits radio waves from a base station and a transmission direction of the radio waves.

According to the present invention, the area radius is calculated based on the height of the antenna that transmits radio waves from the base station and the transmission direction of the radio waves. In the existing mobile communication system using W-CDMA, there is no need to allocate random access control signals based on the size of the area radius, and the capacity of the base station device can be regarded as the cell radius in the setting of the area radius. However, because there is a large difference from the actual maximum propagation distance from a base station to a mobile station and signal sequences are excessively allocated, it is difficult to maintain a separation of signal sequences in the allocation to avoid overlap of signal sequences. According to the present invention, it is possible to calculate the cell radius close to a service area where radio waves actually reach. By calculating the number of signals based on the cell radius and allocating a signal sequence, it is possible to allocate the minimum required signal sequence to the communication area.

Further, in the signal sequence allocating device according to the present invention, it is preferred that the area radius calculation means calculates the area radius based on propagation delay between a base station and an antenna that transmits radio waves from the base station.

According to the present invention, the area radius is calculated based on the propagation delay between the base station and the antenna that transmits radio waves from the base station. Thus, setting a base station device as a transmission specified point, the area radius can be calculated in consideration of the propagation delay between the antenna that transmits radio wave and the base station connected thereto, and it is possible to calculate the cell radius close to a service area where radio waves actually reach. By calculating the number of signals based on the cell radius and allocating a signal sequence, it is possible to allocate the minimum required signal sequence to the communication area. Note that the propagation delay can be obtained by actual measurement.

Further, in the signal sequence allocating device according to the present invention, it is preferred that the area radius calculation means calculates the area radius based on an amount of delay in a radio amplification device that relays and amplifies radio waves from a base station.

According to the present invention, the area radius is calculated based on the amount of delay in the radio amplification device that relays and amplifies radio waves from the base station. It is thereby possible to calculate the cell radius close to a service area where radio waves actually reach. By calculating the number of signals based on the cell radius and allocating a signal sequence, it is possible to allocate the minimum required signal sequence to the communication area.

Further, in the signal sequence allocating device according to the present invention, it is preferred that the area radius calculation means calculates the area radius based on a degree of amplification of radio waves in a radio amplification device that relays and amplifies radio waves from a base station.

According to the present invention, the area radius is calculated based on the degree of amplification of radio waves in the radio amplification device that relays and amplifies radio waves from the base station. It is thereby possible to calculate the cell radius close to a service area where radio waves actually reach. By calculating the number of signals based on the cell radius and allocating a signal sequence, it is possible to allocate the minimum required signal sequence to the communication area.

Further, in the signal sequence allocating device according to the present invention, it is preferred that the signal sequence allocation means sequentially allocates signal sequences to communication areas in ascending order of distance from a given base point.

According to the present invention, signal sequences are sequentially allocated to communication areas in ascending order of distance from a given base point. It is thereby possible to avoid overlap of signals with peripheral communication areas.

Further, in the signal sequence allocating device according to the present invention, it is preferred that when allocating a signal sequence to a communication area, the signal sequence allocation means allocates a signal sequence that maintains a separation distance between the communication area and another communication area to which a signal sequence containing at least one of same signals as signals in the signal sequence is allocated, and, when a predetermined separation distance is not maintained for all of allocable signals, allocates a signal sequence composed of signals that maintain a longest separation distance.

According to the present invention, when allocating a signal sequence to a communication area, a signal sequence is allocated that maintains a separation distance between the communication area and another communication area to which a signal sequence containing at least one of same signals as signals in the signal sequence is allocated, and, when a predetermined separation distance is not maintained for all of allocable signals, a signal sequence composed of signals that maintain a longest separation distance is allocated. It is thereby possible to repeatedly allocate signal sequences so that there is no overlap of signals with peripheral communication areas or a separation distance is maintained as long as possible from a communication area to which the same signal is allocated.

Further, in the signal sequence allocating device according to the present invention, it is preferred that the signal sequence allocation means allocates signal sequences containing overlapping signals to a plurality of communication areas of a base station where timing to transmit a signal sequence to the base station is different.

According to the present invention, signal sequences containing overlapping signals are allocated to a plurality of communication areas of a base station where timing to transmit a signal sequence to the base station is different. In such a case, because the timing to transmit a signal sequence to a base station differs (does not collide) in the communication area, a mobile station can make a communication connection even when signal sequences containing overlapping signals are allocated. It is thereby possible to allocate the minimum required signal sequence to the area to which the signal sequence is to be allocated without excessively allocating signal sequences.

Further, in the signal sequence allocating device according to the present invention, it is preferred that the signal sequence allocation means allocates signal sequences containing the same signals to a plurality of communication areas of a base station where timing to transmit a signal sequence to the base station is different and the number of signals calculated by the signal number calculation means is the same.

According to the present invention, signal sequences containing the same signals are allocated to a plurality of communication areas of a base station where timing to transmit a signal sequence to the base station is different and the number of signals calculated by the signal number calculation means is the same. It is thereby possible to allocate the minimum required signal sequence to the area to which the signal sequence is to be allocated without excessively allocating signal sequences.

Further, in the signal sequence allocating device according to the present invention, it is preferred that the signal sequence allocation means allocates signal sequences to communication areas of the base station in descending order of number of signals calculated by the signal number calculation means.

According to the present invention, signal sequences are allocated to communication areas of the base station in descending order of number of signals calculated by the signal number calculation means. The process to allocate signal sequences containing overlapping signals to a plurality of base station sectors of a base station where the timing to transmit a signal sequence to a base station is different thereby becomes more concrete, thus allowing repeated allocation of signal sequences.

Further, in the signal sequence allocating device according to the present invention, it is preferred that when allocating a signal sequence to one communication area, the signal sequence allocation means allocates a signal sequence that maintains a separation distance between said one communication area and another communication area in which timing to transmit a signal sequence to a base station is the same as in said one communication area and to which a signal sequence containing at least one of same signals as signals in the signal sequence is allocated.

According to the present invention, when allocating a signal sequence to one communication area, a signal sequence is allocated that maintains a separation distance between said one communication area and another communication area in which timing to transmit a signal sequence to a base station is the same as in said one communication area and to which a signal sequence containing at least one of same signals as signals in the signal sequence is allocated. It is thereby possible to repeatedly allocate signal sequences so that there is no overlap of signals in communication areas where the timing to transmit a signal sequence to a base station is the same or a separation distance is maintained as long as possible from a communication area in which the timing to transmit a signal sequence to a base station is the same and to which the same signal is allocated.

Further, in the signal sequence allocating device according to the present invention, it is preferred that when a signal sequence that maintains a separation distance is not allocable to said one communication area, the signal sequence allocation means changes transmission timing of a signal sequence to a base station in said another communication area into different transmission timing.

According to the present invention, when a signal sequence that maintains a separation distance is not allocable to said one communication area, transmission timing of a signal sequence to a base station in said another communication area is changed into different transmission timing. It is thereby possible to repeatedly allocate signal sequences so that there is no overlap of signals in communication areas where the timing to transmit a signal sequence to a base station is the same or a separation distance is maintained as long as possible from a communication area in which the timing to transmit a signal sequence to a base station is the same and to which the same signal is allocated.

Advantageous Effects of Invention

According to the present invention, it is possible to allocate signal sequences efficiently and appropriately.

BRIEF DESCRIPTION OF DRAWINGS

FIG. 3 is a table showing an example of data stored in a base station specifications management module 9.

FIG. 4 is a table showing an example of data stored in a configuration parameter management module 10.

FIG. 5 is a table showing an example of data stored in a signal sequence management module 11.

FIG. 6 is a table showing another example of data stored in the signal sequence management module 11.

FIG. 9 is a diagram showing an example of a divided signal table.

FIG. 17 is an explanatory diagram showing allocation of signal sequences with a separation distance maintained to base station sectors.

DESCRIPTION OF EMBODIMENTS

An embodiment of the present invention is described hereinafter with reference to the appended drawings. Where possible, the same elements are denoted by the same reference symbols, and the redundant explanation thereof is omitted.

Figure 1:
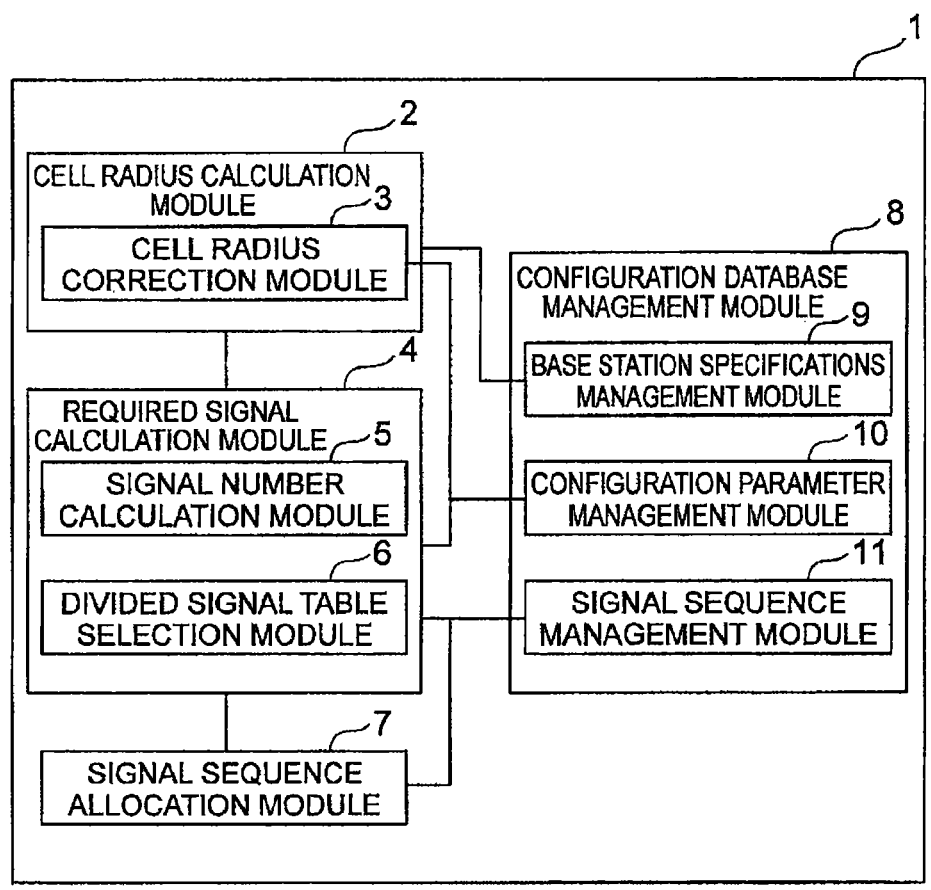
FIG. 1 is a block diagram showing a configuration of a signal sequence allocating device according to an embodiment.

FIG. 1 is a block diagram showing a configuration of a signal sequence allocating device according to an embodiment. As shown in FIG. 1, the signal sequence allocating device 1 includes a cell radius calculation module 2 (area radius calculation means), a cell radius correction module 3, a required signal calculation module 4, a signal number calculation module 5 (signal number calculation means), a divided signal table selection module 6 (divided signal table selection means), a signal sequence allocation module 7 (signal sequence allocation means), a configuration database management module 8, a base station specifications management module 9, a configuration parameter management module 10, and a signal sequence management module 11.

Figure 2:
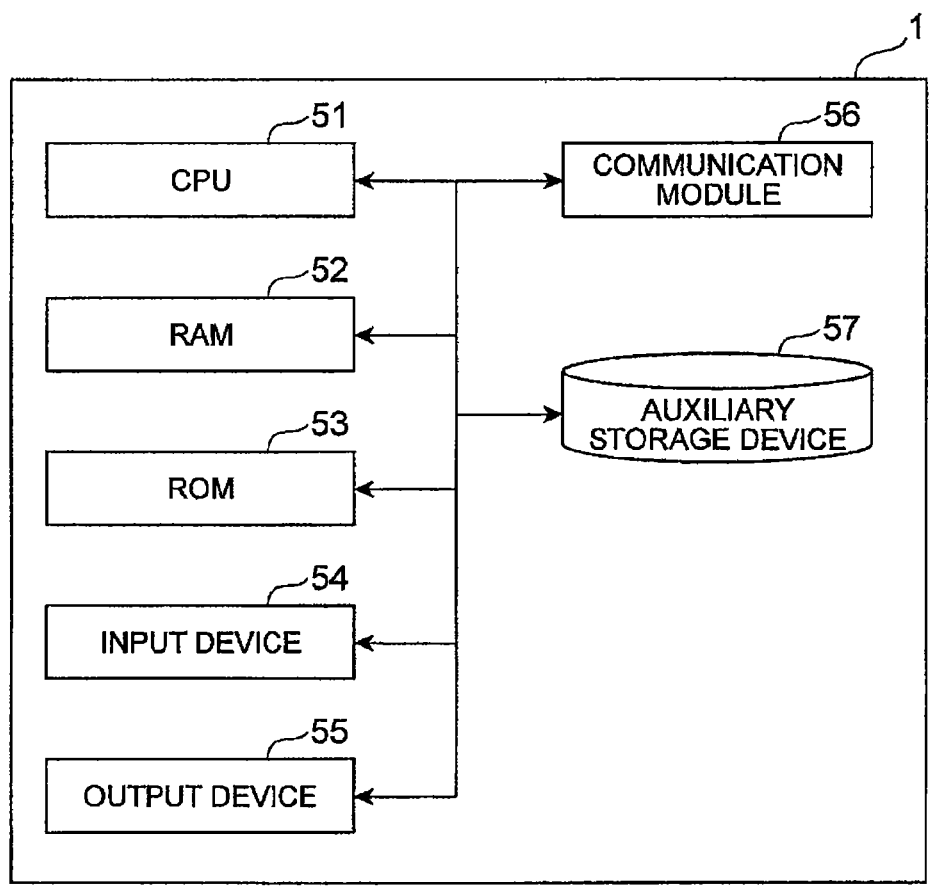
FIG. 2 is a hardware configuration diagram of a signal sequence allocating device 1.

The signal sequence allocating device 1 is configured through hardware such as a CPU. FIG. 2 is a hardware configuration diagram of the signal sequence allocating device 1. The signal sequence allocating device 1 shown in FIG. 1 is physically configured as a computer system that includes a CPU 51, RAM 52 and ROM 53 serving as a main memory device, an input device 54 such as a keyboard and mouse serving as an input device, an output device 55 such as a display, a communication module 56 serving as a data transmitting and receiving device such as a network card, an auxiliary storage device 57 such as a hard disk and the like. The functional blocks shown in FIG. 1 are implemented by loading given computer software onto hardware such as the CPU 51 or the RAM 52 shown in FIG. 2, making the input device 54, the output device 55, and the communication module 56 operate under control of the CPU 51, and performing reading and writing of data in the RAM 52 or the auxiliary storage device 57. Each of the functional blocks shown in FIG. 1 is described hereinbelow.

The configuration database management module 8 includes the base station specifications management module 9, the configuration parameter management module 10 and the signal sequence management module 11, and stores basic data that is required when the signal sequence allocating device 1 allocates signal sequences.

The base station specifications management module 9 stores basic data that is used when the cell radius calculation module 2 calculates a cell radius. FIG. 3 shows one specific example of data stored by the base station specifications management module 9. The base station specifications management module 9 stores a base station ID, base station name, base station sector number, latitude/longitude, altitude, transmission frequency, antenna type, antenna height, directivity direction, electrical tilt angle, mechanical tilt angle and the like shown in FIG. 3, for example.

The configuration parameter management module 10 stores data that is used when the cell radius correction module 3 corrects a cell radius or when the required signal calculation module 4 (or the divided signal table selection module 6) selects a divided signal table. FIG. 4 shows one specific example of data stored by the configuration parameter management module 10. The configuration parameter management module 10 stores a base station ID, open-close/device (open space indicates an outdoor model; closed space indicates an indoor model), coverage flag, high-speed traffic line flag, optical interval delay being the amount of delay between an antenna and a base station, delay within a device being the amount of delay within a radio amplification device and the like shown in FIG. 4, for example.

The signal sequence management module 11 stores data related to a signal table and a divided signal table that contain allocable signals that is used by the required signal calculation module 4 (or the divided signal table selection module 6) and the signal sequence allocation module 7. FIG. 5 shows one specific example of data stored by the signal sequence management module 11. The signal sequence management module 11 stores a signal ID, coverage flag, high-speed traffic line flag and the like shown in FIG. 5, for example. FIG. 6 shows another specific example of data stored by the signal sequence management module 11. A difference between FIG. 6 and FIG. 5 is whether a plurality of high-speed traffic line flag columns are contained or not (which is described later).

The divided signal table is described hereinafter with reference to FIGS. 5 and 9. The data in the coverage flag column A indicates information of the divided signal table that is selected for a certain coverage A. Specifically, a divided signal table containing signals with the signal ID of 1 to 28 is selected for the coverage A. Note that additional allocation reserves M, which are signals with the signal ID of 26, 27 and 28, are stored as a backup for additional allocation of signals, and the signals included in the additional allocation reserves M are not allocated at the time of normal signal allocation. In this manner, some signals contained in the divided signal table can be stored as additional allocation reserves. Table 1 in FIG. 9 shows the divided signal table indicated by the data in the coverage flag column A of FIG. 5 in a different format. Likewise, Table1 in FIG. 9 shows the divided signal table indicated by the data in the coverage flag column B of FIG. 5 in a different format.

The cell radius calculation module 2 calculates the cell radius of an area to which a signal sequence is to be allocated among areas of the base station sector on the basis of data of the base station specifications management module 9 and outputs it to the required signal calculation module 4. Specifically, at the time of cell radius calculation, the cell radius calculation module 2 calculates the cell radius based on the arrival direction of radio waves from a base station, the height of an antenna that transmits radio waves from a base station, and altitude data of an antenna. An area close to the actual radio wave arrival area can be thereby treated as the cell radius.

Figure 7:
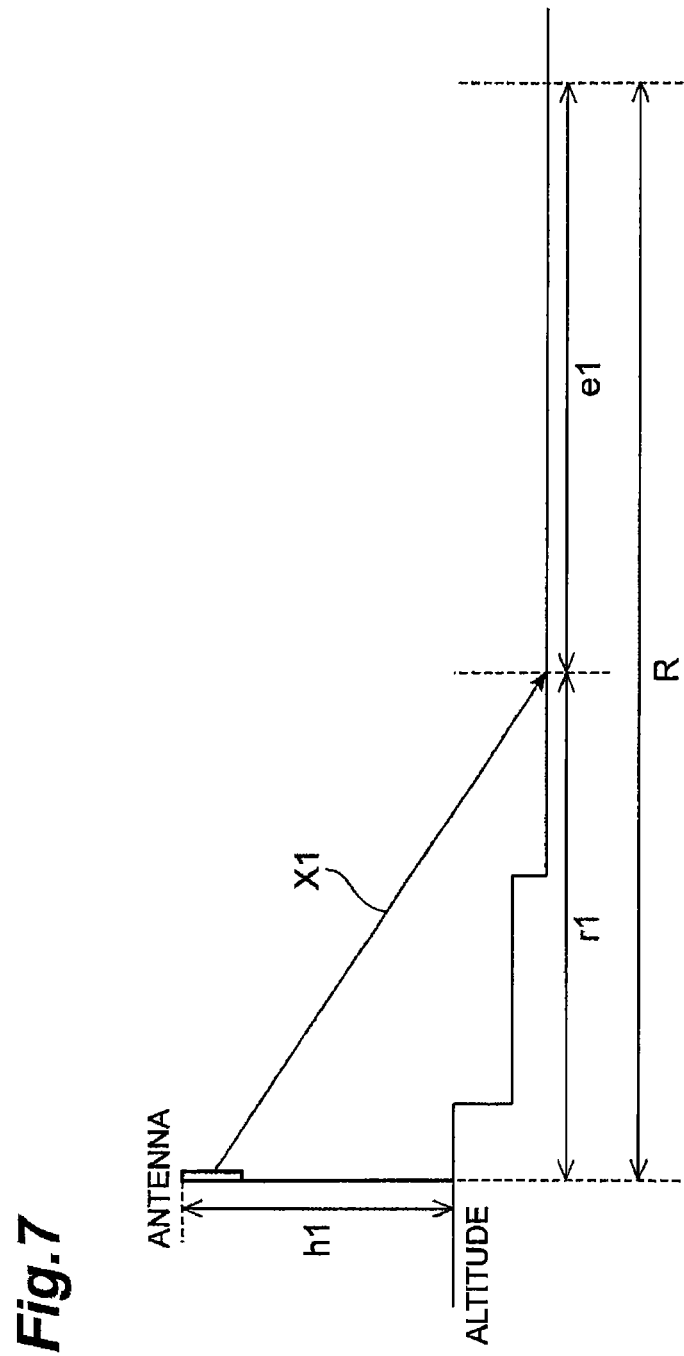
FIG. 7 is a diagram showing an arrival area of radio waves from a base station.

FIG. 7 is a diagram showing the arrival area of radio waves from a base station. The cell radius R is a cell radius based on the existing concepts, and it is a cell radius where the capacity of the base station device is defined as the arrival area. On the other hand, the cell radius r1 is a cell radius that is calculated by the cell radius calculation module 2, and it is a cell radius when the arrival area is defined based on a radio wave arrival direction X1, an antenna height h1, and a difference in altitude between an antenna from which radio waves are transmitted and a position where the radio waves are received. Note that a differential distance e1 indicates the distance of a difference between the cell radius R and the cell radius r1 and can be treated as an unnecessary cell radius. In this manner, by allocating signal sequences on the basis of the radius r1, excessive allocation of signals can be prevented by the amount of the differential distance e1 compared with the case of allocating signal sequences on the basis of the cell radius R based on the existing concepts.

The cell radius correction module 3 corrects the cell radius calculated by the cell radius calculation module 2 based on area factors of data stored in the configuration parameter management module 10 (for example, propagation delay between the base station device and the antenna, the amount of delay within the radio amplification device, the degree of amplification of radio waves by the radio amplification device and the like) in order to obtain the cell radius based on the more accurate radio wave arrival area.

Figure 8:
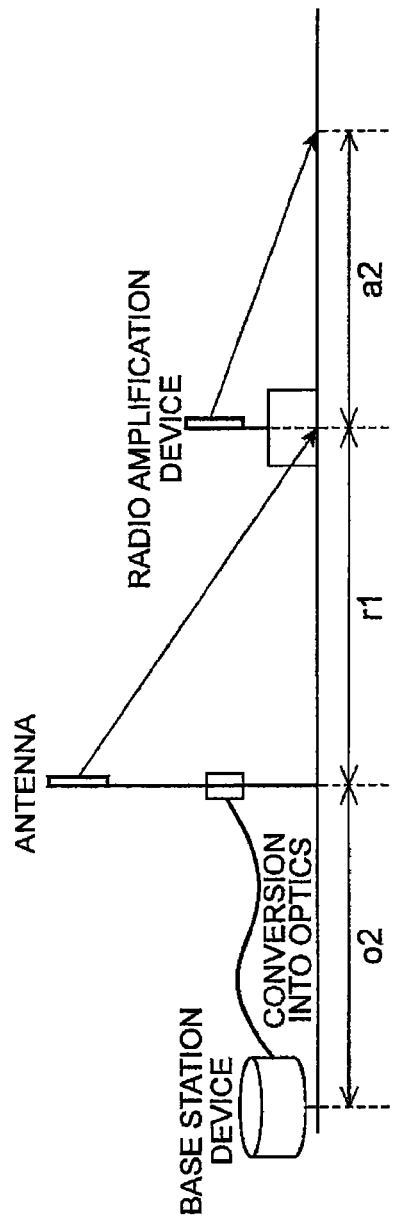
FIG. 8 is a diagram showing an arrival area of radio waves in a configuration of a base station device, an antenna, and a radio amplification device.

FIG. 8 is a diagram showing a configuration in the case where a base station device and an antenna are distant, and a radio amplification device that relays and amplifies radio waves from a base station is included. In FIG. 8, when the base station device and the antenna are connected through an optical fiber (conversion of radio interval into optics) and they are situated at a distance of o2, for example, the radio wave arrival area varies depending on the distance o2. Then, the cell radius correction module 3 corrects the area radius based on the propagation delay (the amount of delay in optical interval which is stored in the configuration parameter management module 10) between the antenna from which radio waves are transmitted and the base station connected thereto, using the base station device as a transmission specified point. The propagation delay increases as the distance between the base station device and the antenna becomes longer.

Further, when radio waves are amplified by the radio amplification device, the area radius is corrected based on the amount of delay within the device which is stored in the configuration parameter management module 10. Further, the radio wave arrival area varies depending on the degree of amplification. For example, in the configuration shown in FIG. 8, the arrival area becomes larger by the distance a2. Thus, the cell radius correction module 3 may further correct the area radius based on the degree of amplification of radio waves by the radio amplification device.

The required signal calculation module 4 is composed of the signal number calculation module 5 and the divided signal table selection module 6. The required signal calculation module 4 receives the cell radius from the cell radius calculation module 2.

The signal number calculation module 5 calculates the number of signals contained in a signal sequence to be allocated to a base station sector based on the cell radius input from the cell radius calculation module 2 and the data stored in the configuration parameter management module 10 and the signal sequence management module 11. In mobile communication, a larger number of signals are generally required as the cell radius is larger. Thus, the signal number calculation module 5 calculates the number of signals in proportion to the size of the cell radius to be specific. Further, the signal number calculation module 5 may store the correspondence between the cell radius and the number of signals in advance and calculate the number of signals from the cell radius based on the correspondence. The signal number calculation module 5 (or the required signal calculation module 4) outputs the calculated number of signals to the signal sequence allocation module 7.

When a signal table containing allocable signals is divided in advance into two or more divided signal tables, the divided signal table selection module 6 selects one divided signal table for each base station sector based on the data stored in the configuration parameter management module 10 and the signal sequence management module 11. For example, at the time of selecting a divided signal table for the base station sector with the base station ID of 111111 in FIG. 4, the divided signal table selection module 6 determines that the coverage flag for the base station ID of 111111 is A from the table of FIG. 4, acquires a divided signal table for the coverage flag A from the table of FIG. 5, and selects the divided signal table for the base station sector. When both of the coverage flag and the high-speed traffic line flag are designated in the table of FIG. 4, the divided signal table selection module 6 selects the divided signal table indicated by the high-speed traffic line flag. Note that, in this case, the divided signal table selection module 6 may select the divided signal table indicated by the coverage flag.

Among base station sectors of a base station managed by a certain management body (a management body A, for example), a base station sector adjacent to a base station sector managed by another management body (a management body B, for example) is referred to as a boundary sector.

Figure 10:
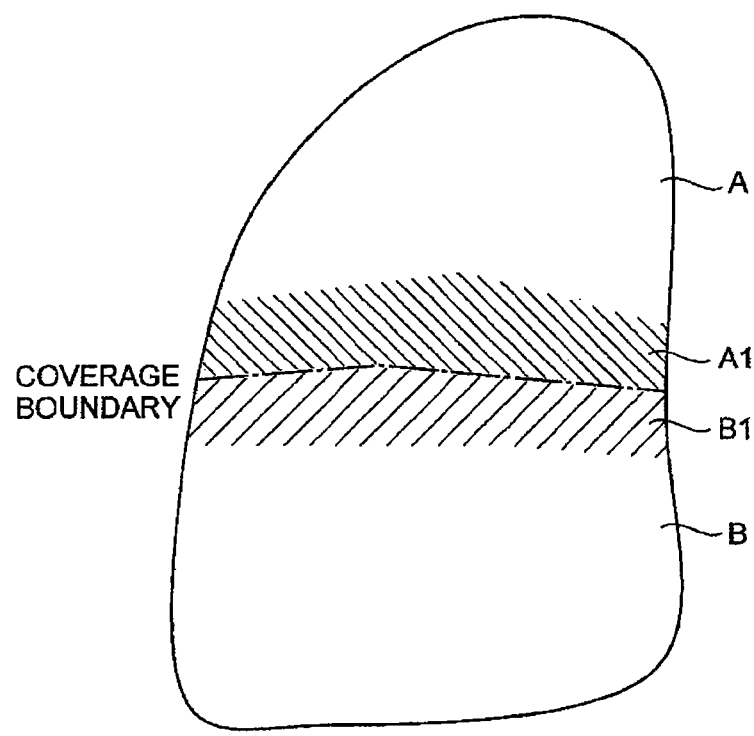
FIG. 10 is a diagram showing an example of a range of boundary sectors.

FIG. 10 is a diagram showing the range of base station sectors including boundary sectors managed by the management body A and the management body B. The coverage A indicates the area of a base station sector that is managed by the management body A, and the coverage B indicates the area of a base station sector that is managed by the management body B. Further, the boundary sector A1 indicates the area of a boundary sector that is managed by the management body A, and the boundary sector B1 indicates the area of a boundary sector that is managed by the management body B.

In the case of FIG. 10, when the signal sequence allocating device 1 allocates a signal sequence to the coverage A, the divided signal table selection module 6 may select, for the boundary sector A1, a divided signal table different from the divided signal table for the boundary sector B1. Likewise, when the signal sequence allocating device 1 allocates a signal sequence to the coverage B, the divided signal table selection module 6 may select, for the boundary sector B1, a divided signal table different from the divided signal table for the boundary sector A1. For example, the divided signal table selection module 6 may select the divided signal table indicated by Table 1 in FIG. 9 for the boundary sector A1, and select the divided signal table indicated by Tablet in FIG. 9 for the boundary sector B1.

Further, the divided signal table selection module 6 may select, for a predetermined base station sector, a divided signal table different from that for a peripheral base station sector. For example, for a base station sector that includes a rapid-transit railway and its vicinity, the divided signal table selection module 6 selects a divided signal table different from that for a peripheral base station sector to avoid that a signal sequence interferes with a signal sequence of a peripheral base station sector due to Doppler shift and affects the connection quality. Specifically, for a base station sector that includes a rapid-transit railway and its vicinity, the divided signal table selection module 6 selects a divided signal table that is made up of signals for which the high-speed traffic line flag is ON in FIG. 5. Note that although there is only one high-speed traffic line flag column in FIG. 5, there may be a plurality of kinds of high-speed traffic line flag columns as shown in FIG. 6 so that different high-speed traffic line flag columns are selected for base station sectors that include a rapid-transit railway and its vicinity.

The divided signal table selection module 6 (or the required signal calculation module 4) outputs the selection relation between a base station sector and a divided signal table to the signal sequence allocation module 7.

The signal sequence allocation module 7 allocates a signal sequence to a base station sector based on the number of signals input from the required signal calculation module 4 (or the signal number calculation module 5) and the data stored in the signal sequence management module 11. Specifically, the signal sequence allocation module 7 selects signals corresponding to the number of signals input from the required signal calculation module 4 (or the signal number calculation module 5) from the signal table (or the divided signal table) containing allocable signals that is stored in the signal sequence management module 11 and allocates a signal sequence composed of the selected signals to a base station sector. When selecting signals, arbitrary signals may be selected such as consecutive signals or discrete signals. Note that the signal sequence allocation module 7 may output a signal sequence allocation result to the output device 55, the auxiliary storage device 57, an external device (for example, LTE NW System) or the like.

The signal sequence allocation module 7 may sequentially allocate signal sequences to base station sectors in ascending order of distance from a given base point.

Further, the signal sequence allocation module 7 may further receive the selection relation between a base station sector and a divided signal table from the required signal calculation module 4 (or the divided signal table selection module 6). In this case, when allocating a signal sequence to a base station sector, the signal sequence allocation module 7 allocates a signal sequence to the base station sector based on the divided signal table selected for the base station sector and the number of signals input to the signal sequence allocation module 7.

Further, when allocating a signal sequence to a base station sector, the signal sequence allocation module 7 may allocate a signal sequence that maintains a separation distance between the base station sector and another base station sector to which a signal sequence containing at least one of the same signals as signals in the signal sequence is allocated and, when a given separation distance cannot be maintained for all allocable signals, allocate a signal sequence composed of signals that maintain the longest separation distance.

Figure 11:
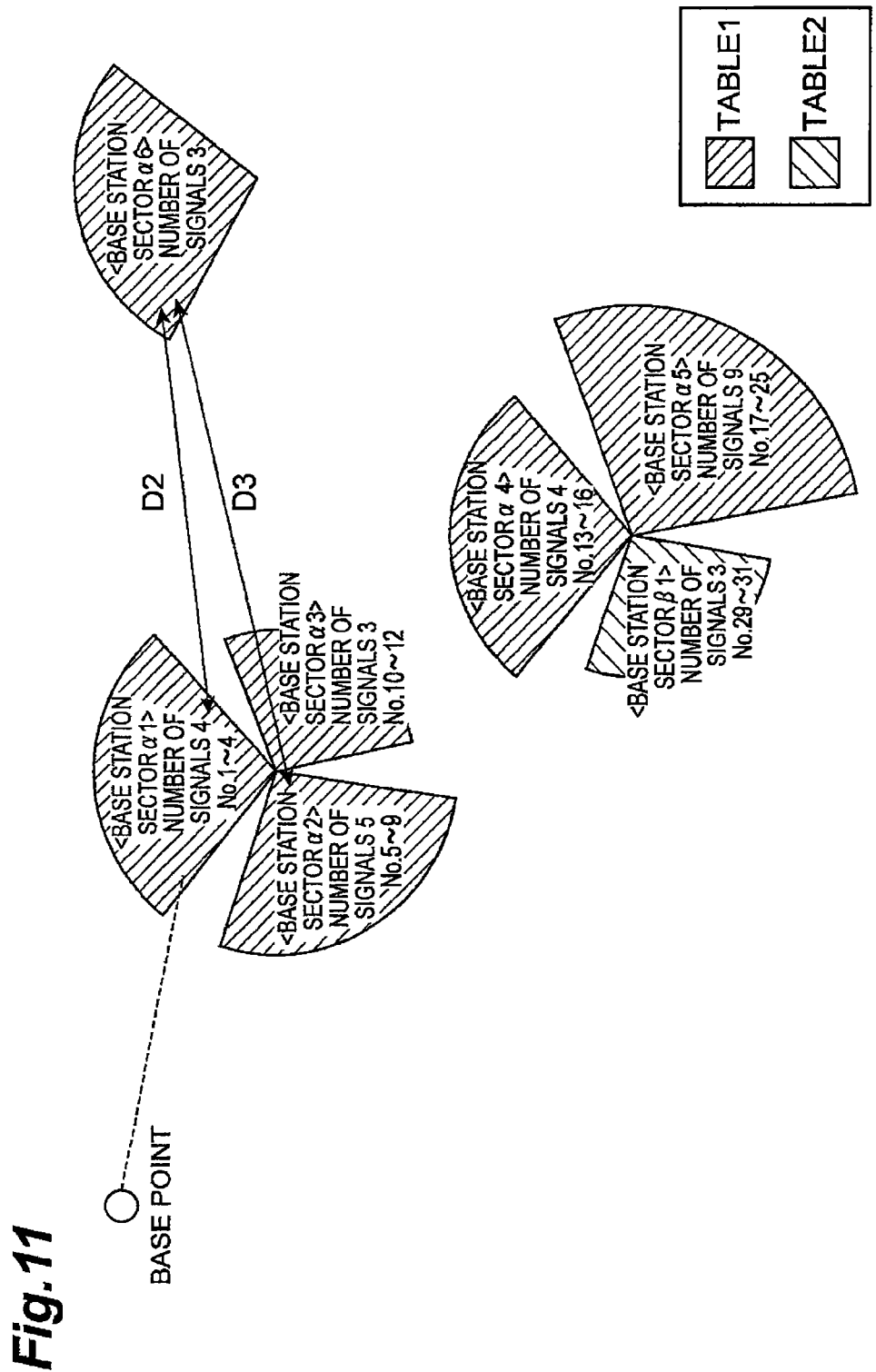
FIG. 11 is an explanatory diagram showing allocation of signal sequences to base station sectors.

The allocation of signal sequences by the above-described signal sequence allocation module 7 is described hereinafter with reference to FIG. 11. FIG. 11 is an explanatory diagram showing allocation of signal sequences to base station sectors. As shown in FIG. 11, a predetermined base point to serve as a reference point and base station sectors a1 to a6 and β1 are included. It is assumed that the signal number calculation module 5 (or the required signal calculation module 4) has calculated that the number of signals of the base station sector α1 is 4, the number of signals of the base station sector α2 is 5, the number of signals of the base station sector α3 is 3, the number of signals of the base station sector α4 is 4, the number of signals of the base station sector α5 is 9, the number of signals of the base station sector α6 is 3, and the number of signals of the base station sector β is 3. It is also assumed that the divided signal table selection module 6 (or the required signal calculation module 4) has selected the divided signal table Table 1 for the base station sectors α1 to α6 and the divided signal table Tablet for the base station sector β1.

First, the signal sequence allocation module 7 sequentially allocates signal sequences to the base station sectors for which the divided signal table Table1 has been selected, in ascending order of distance from the base point. Specifically, to the base station sector α1 at the shortest distance from the base point, the signal sequence allocation module 7 allocates a signal sequence composed of four signals with the signal ID of 1 to 4 in the divided signal table Table1 because the number of signals of the base station sector α1 is 4. At the same time, the signal sequence allocation module 7 stores allocation information indicating that the signal sequence with the signal ID of 1 to 4 is allocated to the base station sector α1 into the signal sequence management module 11. In the following description, when a signal sequence is allocated to a base station sector, the allocation information is stored into the signal sequence management module 11. Next, to the base station sector α2 at the second shortest distance from the base point, the signal sequence allocation module 7 allocates a signal sequence composed of five signals with the signal ID of 5 to 9, excluding the signals already allocated, in the divided signal table Table1 because the number of signals of the base station sector α2 is 5. To the base station sectors α3 to α5, the signal sequence allocation module 7 allocates signal sequences as shown in FIG. 11 in the same manner.

The case where the signal sequence allocation module 7 allocates a signal sequence to the base station sector α6 is described hereinbelow. The signal sequence allocation module 7 has allocated all of the allocable signals in the divided signal table Table1 to the base station sectors α1 to α5 up to this point. Then, the signal sequence allocation module 7 returns to the beginning of the divided signal table Table1 to allocate a signal sequence composed of signals with the signal ID of 1 to 4 to the base station sector α6. At this time, the signal sequence allocation module 7 calculates the separation distance between the base station sector α6 and the base station sector α1 to which the same signals have been allocated (for example, the shortest distance of a straight line connecting points within the respective sector forms of the base station sectors α1 and α6 in FIG. 1). Note that the sector form indicates a service area. It is assumed that the signal sequence allocation module 7 has not been able to ensure the predetermined separation distance. Next, the signal sequence allocation module 7 calculates the separation distance from the base station sector α2 to which a signal sequence composed of signals with the signal ID of 5 to 9 has been allocated in the same manner and, in this case, it is assumed that the signal sequence allocation module 7 has been able to ensure the predetermined separation distance. Then, the signal sequence allocation module 7 allocates, to the base station sectors α6, a signal sequence composed of three signals with the signal D of 5 to 7 (which is the number of signals for the base station sector α6) among the signals with the signal ID of 5 to 9 in the signal sequence allocated to the base station sectors α2.

Note that, when the signal sequence allocation module 7 is not able to ensure the separation distance for all of the base station sectors α1 to α5, the signal sequence allocation module 7 allocates a signal sequence composed of the signals of the base station sector α2 for which the longest separation distance can be maintained to the base station sectors a6.

Next, the signal sequence allocation module 7 sequentially allocates signal sequences to the base station sectors for which the divided signal table Table2 has been selected, in ascending order of distance from the base point. Specifically, to the base station sector β1 at the shortest distance from the base point, the signal sequence allocation module 7 allocates a signal sequence composed of three signals with the signal ID of 29 to 31 in the divided signal table Table2 because the number of signals of the base station sector β1 is 3. In this manner, the signal sequence allocation module 7 allocates signal sequences to the base station sectors based on the input number of signals or the selection relation between a base station sector and a divided signal table.

Further, the signal sequence allocation module 7 allocates signal sequences containing overlapping signals to base station sectors where the timing to transmit a signal sequence to a base station is different from each other among a plurality of base station sectors of the base station. The signal sequence allocation module 7 may allocate signal sequences containing the same signals to base station sectors where the timing to transmit a signal sequence to a base station is different from each other and the number of signals calculated by the signal number calculation module 5 (or the required signal calculation module 4) is the same among a plurality of base station sectors of the base station. Further, the signal sequence allocation module 7 may sequentially allocate signal sequences to base station sectors in descending order of the number of signals calculated by the signal number calculation module 5 (or the required signal calculation module 4) among those base stations. Furthermore, when the timing to transmit a signal sequence to a base station is different from each other among a plurality of base stations, the signal sequence allocation module 7 may allocate signal sequences containing the same signals as many as possible.

The timing of transmission is described hereinbelow. In a mobile communication system using OFDMA (Orthogonal Frequency Division Multiple Access) which is different from W-CDMA (Wideband Code Division Multiple Access), it is necessary to allocate ID to a base station sector in consideration of three group IDs (identification information assigned to groups of base station sectors). The three group IDs are Local ID, Cell Group ID, and Hopping pattern. The timing to transmit a signal sequence in a base station sector is determined on the basis of Local ID that is assigned to the base station sector. For example, when 0, 1 and 2 are assigned as Local ID to three base station sectors, the timing to transmit a signal sequence in a base station sector with Local ID of 0, the timing to transmit a signal sequence in a base station sector with Local ID of 1 and the timing to transmit a signal sequence in a base station sector with Local ID of 2 are all different. In other words, if Local IDs assigned to base station sectors are different, the timing to transmit a signal sequence in the respective base station sectors is different. Thus, because synchronization is made between base station sectors in the same base station, the timing to transmit a signal sequence differs (does not collide) if Local ID is different, and therefore signal sequences containing the same signals can be allocated. Further, when synchronization is made between different base stations, the timing to transmit a signal sequence differs (does not collide) if Local ID is different between base station sectors in different base station, and therefore, signal sequences containing the same signals can be allocated. Note that Local ID is typically 0 to 2, which is three IDs, as described above.

Figure 14:
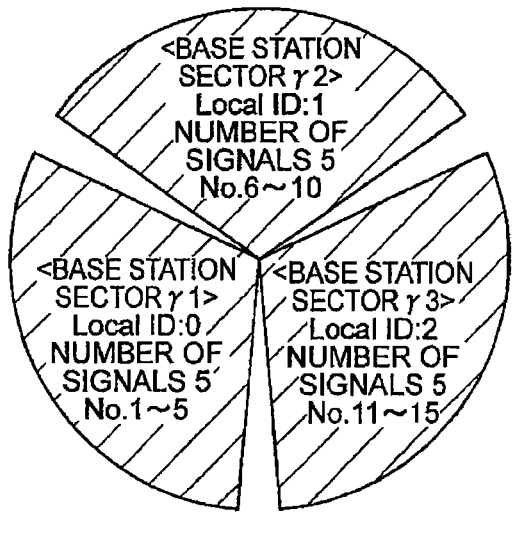
FIG. 14 is an explanatory diagram (1) showing allocation of overlapping signal sequences to base station sectors.
Figure 14:
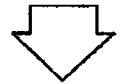
Figure 14:
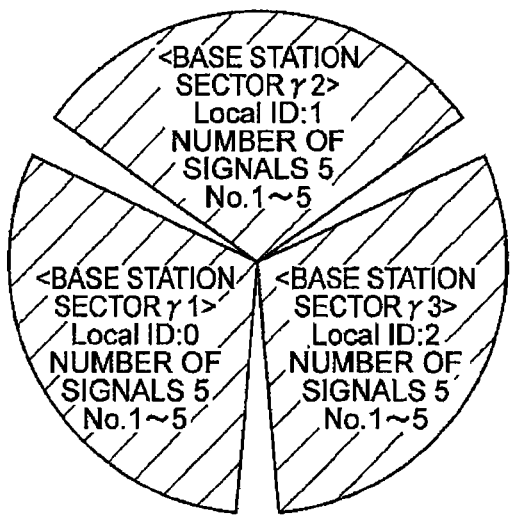

The allocation of signal sequences by the above-described signal sequence allocation module 7 is described hereinafter in detail with reference to FIGS. 14 and 15. FIG. 14 is an explanatory diagram showing the allocation of overlapping signal sequences to base station sectors by the signal sequence allocation module 7. FIG. 14(*a*) is a diagram showing the allocation of non-overlapping signal sequences, and FIG. 14(*b*) is a diagram showing the allocation of overlapping signal sequences. As shown in FIGS. 14(*a*) and 14(*b*), base station sectors γ1 to γ3 are included. It is assumed that 0 to 2 are assigned as Local ID of the base station sectors γ1 to γ3, respectively, and 5 is assigned as the number of signals of the base station sectors γ1 to γ3 by the signal number calculation module 5 (or the required signal calculation module 4). Note that, it is assumed, unless otherwise noted, that a divided signal table made up of signals with the signal ID of 1 to 50 is selected by the divided signal table selection module 6 for all base station sectors shown in FIG. 14 and FIGS. 15 to 17, which are described later.

In FIG. 14(*a*), the signal sequence allocation module 7 allocates non-overlapping signal sequences to the respective base station sectors. To be specific, the signal sequence allocation module 7 first allocates, to the base station sector γ1, a signal sequence composed of signals with the signal ID of 1 to 5 because the number of signals is 5. Next, the signal sequence allocation module 7 allocates, to the base station sector γ2, a signal sequence composed of five signals with the signal ID of 6 to 10, which do not overlap with the signal sequence of the base station sector γ1. Likewise, the signal sequence allocation module 7 allocates, to the base station sector γ3, a signal sequence composed of five signals with the signal ID of 11 to 15, which do not overlap with the signal sequences of the base station sectors γ1 and γ2.

On the other hand, in FIG. 14(*b*), the signal sequence allocation module 7 allocates signal sequences containing the same signals to base station sectors where the timing to transmit a signal sequence to a base station is different and the number of signals is the same among a plurality of base station sectors of the base station. Specifically, the signal sequence allocation module 7 allocates signal sequences composed of signals with the signal ID of 1 to 5 to the base station sectors γ1 to γ3 where the assigned Local ID is different from one another and the number of signals is 5, which is the same.

Figure 15:
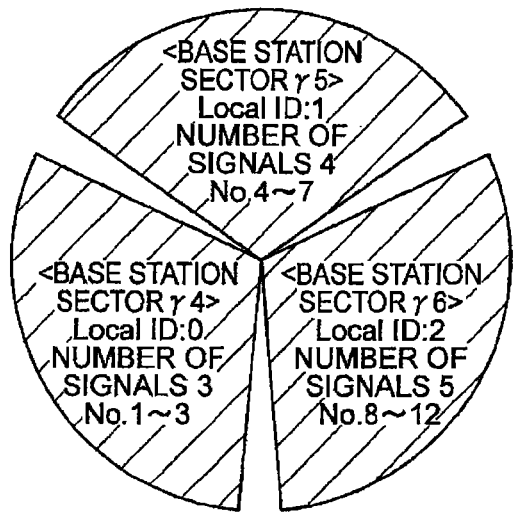
FIG. 15 is an explanatory diagram (2) showing allocation of overlapping signal sequences to base station sectors.
Figure 15:
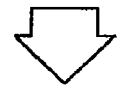
Figure 15:
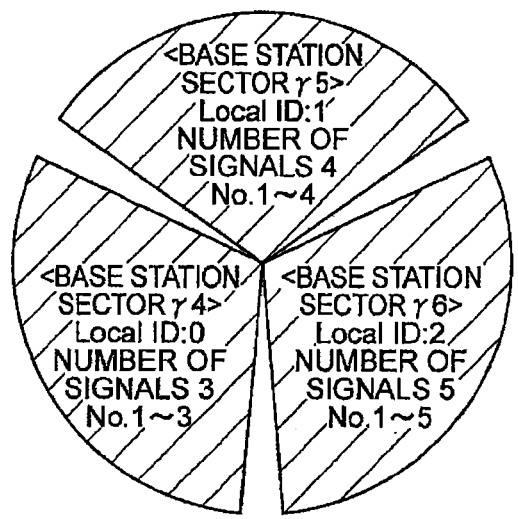

FIG. 15 is an explanatory diagram showing the allocation of overlapping signal sequences to base station sectors by the signal sequence allocation module 7 in the case where the number of signals of each base station sector is different. FIG. 15(*a*) is a diagram showing the allocation of non-overlapping signal sequences, and FIG. 15(*b*) is a diagram showing the allocation of overlapping signal sequences. As shown in FIGS. 15(*a*) and 15(*b*), base station sectors γ4 to γ6 are included. It is assumed that 0 to 2 are assigned as Local ID of the base station sectors γ4 to γ6, respectively, and 3 to 5 are assigned as the number of signals of the base station sectors γ4 to γ6 by the signal number calculation module 5 (or the required signal calculation module 4), respectively.

In FIG. 15(*a*), the signal sequence allocation module 7 allocates non-overlapping signal sequences to the respective base station sectors. Specifically, the signal sequence allocation module 7 first allocates, to the base station sector γ4, a signal sequence composed of signals with the signal ID of 1 to 3 because the number of signals is 3. Next, the signal sequence allocation module 7 allocates, to the base station sector γ5, a signal sequence composed of four signals with the signal ID of 4 to 7, which do not overlap with the signal sequence of the base station sector γ4. Then, the signal sequence allocation module 7 allocates, to the base station sector γ6, a signal sequence composed of five signals with the signal ID of 8 to 12, which do not overlap with the signal sequences of the base station sectors γ4 and γ5.

On the other hand, in FIG. 15(*b*), the signal sequence allocation module 7 allocates signal sequences containing overlapping signals to the base station sectors where the assigned Local ID is different, among a plurality of base station sectors of the base station, in descending order of the number of signals calculated by the required signal calculation module 4. To be specific, the signal sequence allocation module 7 first allocates, to the base station sector γ6 with the largest number of signals among the base station sectors γ4 to γ6, a signal sequence composed of signals with the signal ID of 1 to 5 because the number of signals is 5. Next, the signal sequence allocation module 7 allocates a signal sequence to the base station sector γ5 with the next largest number of signals to the base station sector γ6. Because Local ID is different, that is, the timing to transmit a signal sequence to a base station is different, between the base station sector γ5 and the base station sector γ6 to which the signal sequences have been allocated, the signal sequence allocation module 7 can allocate, to the base station sector γ5, a signal sequence containing overlapping signals with the signals contained in the signal sequence allocated to the base station sector γ6. To be specific, the signal sequence allocation module 7 allocates, to the base station sector γ5, a signal sequence composed of signals with the signal ID of 1 to 4 because the number of signals is 4. Likewise, the signal sequence allocation module 7 allocates, to the base station sector γ4 with the next largest number of signals, a signal sequence composed of signals with the signal ID of 1 to 3 because the number of signals is 3.

Although the signal sequence allocation module 7 has allocated the signal sequence composed of signals with the signal ID of 1 to 4 to the base station sector γ5, it may allocate a signal sequence composed of signals with the signal ID of 2 to 5. Further, the signal sequence allocation module 7 may allocate a signal sequence composed of signals with the signal ID of 1 and 3 to 5 rather than consecutive numbers. Although one given signal ID allocation pattern is shown also in the following description of FIGS. 16 and 17, it is not limited thereto.

Figure 16:
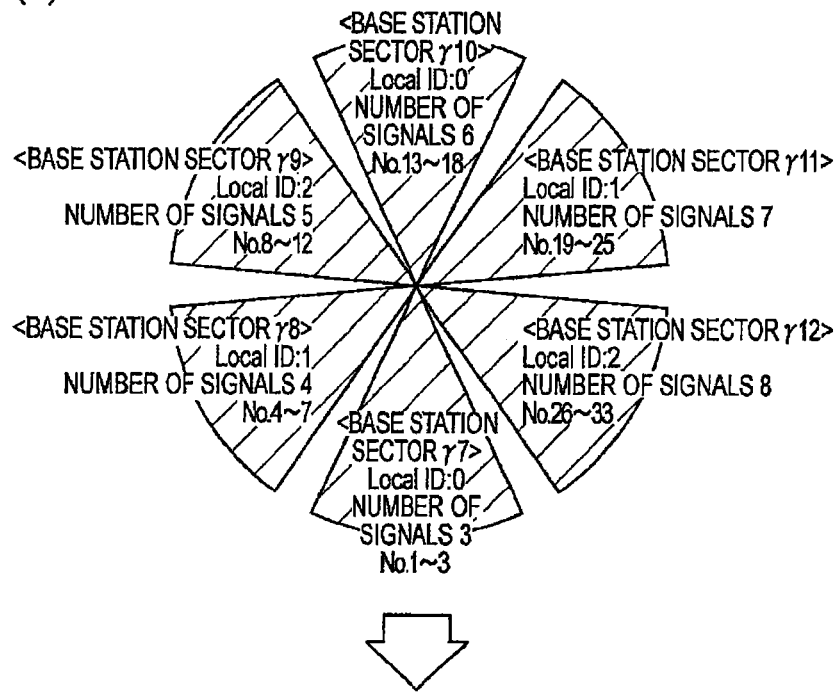
FIG. 16 is an explanatory diagram (3) showing allocation of overlapping signal sequences to base station sectors.
Figure 16:
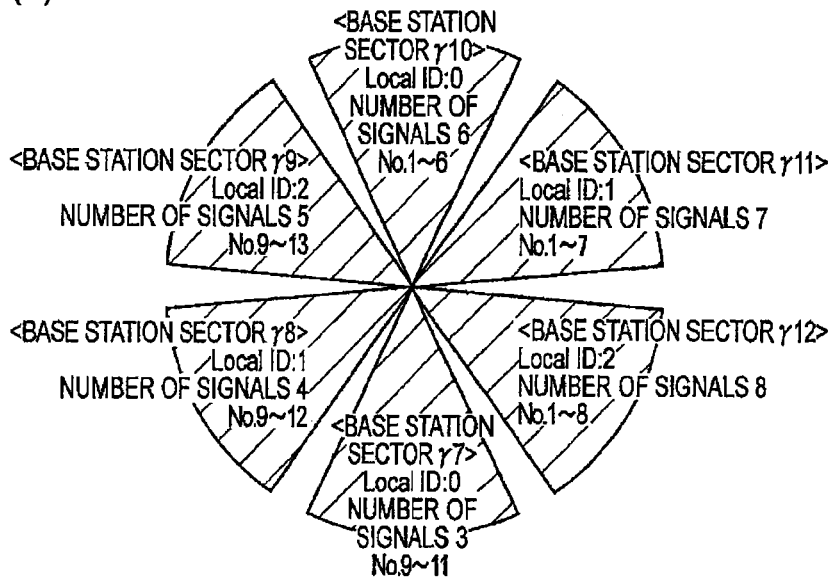

FIG. 16 is an explanatory diagram showing the allocation of overlapping signal sequences to base station sectors by the signal sequence allocation module 7 in the case where the number of signals of each base station sector is different, just like FIG. 15. In FIG. 16, differently from FIG. 15, overlapping Local IDs are assigned to a plurality of base station sectors of a base station. FIG. 16(a) is a diagram showing the allocation of non-overlapping signal sequences, and FIG. 16(b) is a diagram showing the allocation of overlapping signal sequences. As shown in FIGS. 16(a) and 16(b), base station sectors γ7 to 712 are included. It is assumed that 0, 1, 2, 0, 1 and 2 are assigned as Local ID of the base station sectors γ7 to γ12, respectively, and 3, 4, 5, 6, 7 and 8 are assigned as the number of signals of the base station sectors γ7 to γ12 by the signal number calculation module 5 (or the required signal calculation module 4), respectively.

In FIG. 16(a), the signal sequence allocation module 7 allocates non-overlapping signal sequences to the respective base station sectors. Specifically, the signal sequence allocation module 7 first allocates, to the base station sector γ7, a signal sequence composed of signals with the signal ID of 1 to 3 because the number of signals is 3. Next, the signal sequence allocation module 7 allocates, to the base station sector γ8, a signal sequence composed of four signals with the signal ID of 4 to 7, which do not overlap with the signal sequence of the base station sector γ7. Likewise, the signal sequence allocation module 7 allocates a signal sequence composed of signals with the signal ID of 8 to 12 to the base station sector γ9, allocates a signal sequence composed of signals with the signal ID of 13 to 18 to the base station sector γ10, allocates a signal sequence composed of signals with the signal ID of 19 to 25 to the base station sector γ11, and allocates a signal sequence composed of signals with the signal ID of 26 to 33 to the base station sector γ12.

On the other hand, in FIG. 16(b), the signal sequence allocation module 7 allocates signal sequences containing overlapping signals to the base station sectors where the assigned Local ID is different, among a plurality of base station sectors of the base station, in descending order of the number of signals calculated by the required signal calculation module 4. To be specific, the signal sequence allocation module 7 first allocates, to the base station sector γ12 with the largest number of signals among the base station sectors γ7 to γ12, a signal sequence composed of signals with the signal ID of 1 to 8 because the number of signals is 8. Next, the signal sequence allocation module 7 allocates, to the base station sector γ11 with the next largest number of signals to the base station sector γ12 among base station sectors to which Local ID different from that of the base station sector γ12 is assigned, a signal sequence composed of signals with the signal ID of 1 to 7 because the number of signals is 7. Likewise, the signal sequence allocation module 7 allocates, to the base station sector γ10 with the next largest number of signals to the base station sector γ11 among base station sectors to which Local ID different from that of the base station sector γ12 is assigned, a signal sequence composed of signals with the signal ID of 1 to 6 because the number of signals is 6.

Then, because the signal sequences have been allocated once to the base station sectors to which Local ID different from that of the base station sector γ12 is assigned, the signal sequence allocation module 7 allocates a signal sequence to the base station sector γ9 with the next largest number of signals to the base station sector γ10 to which the signal sequence has been allocated last. At this time, the signal sequence allocation module 7 allocates, to the base station sector γ9, a signal sequence containing signals different from the signals contained in the signal sequence allocated to the base station sector γ12 to which the same Local ID is assigned among base station sectors of the same base station. Thus, the signal sequence allocation module 7 allocates a signal sequence composed of signals with the signal ID of 9 to 13 to the base station sector γ9 on the ground that the signal sequence of the base station sector γ12 is composed of signal IDs 1 to 8 and the number of signals of the base station sector γ9 is 5. Next, the signal sequence allocation module 7 allocates, to the base station sector γ8 with the next largest number of signals to the base station sector γ9 among base station sectors to which Local ID different from that of the base station sector γ9 is assigned, a signal sequence composed of signals with the signal ID of 9 to 12 because the number of signals is 4 and the signal sequence of the base station sector γ11 to which the same Local ID is assigned is composed of signal IDs 1 to 7. Likewise, the signal sequence allocation module 7 allocates, to the base station sector γ7 with the next largest number of signals to the base station sector γ8 among base station sectors to which Local ID different from that of the base station sector γ9 is assigned, a signal sequence composed of signals with the signal ID of 9 to 11 because the number of signals is 3 and the signal sequence of the base station sector γ10 to which the same Local ID is assigned is composed of signal IDs 1 to 6.

In the signal sequence allocation of the signal sequence allocation module 7 described above with reference to FIGS. 14 and 15, although the signal sequence allocation module 7 allocates signal sequences to base station sectors in descending order of the number of signals, it is not limited thereto. For example, signal sequences may be allocated to base station sectors in ascending order of the number of signals, or signal sequences may be allocated to base station sectors randomly regardless of the number of signals.

At the time of allocating a signal sequence to one base station sector, the signal sequence allocation module 7 may allocate a signal sequence that maintains a separation distance between one base station sector and another base station sector in which the timing to transmit a signal sequence to a base station is the same as that in one base station sector and to which a signal sequence containing at least one of the same signals as signals in the signal sequence is allocated. Further, at that time, when a signal sequence that maintains a separation distance is not allocable to one base station sector, the signal sequence allocation module 7 may change the timing to transmit a signal sequence to a base station in another base station sector into the different transmission timing.

The allocation of signal sequences by the above-described signal sequence allocation module 7 is described hereinafter with reference to FIG. 17. FIG. 17(a) is a diagram at the time when, in the case where synchronization is made between base stations (base station P and base station Q), the signal sequence allocation module 7 allocates a signal sequence to a base station sector γ18 among base station sectors γ18 to γ20 of the base station Q after the signal sequence allocation module 7 has allocated signal sequences to base station sectors γ13 to γ17 of the base station P. It is assumed that 2, 1, 0, 1 and 2 are assigned as Local ID of the base station sectors γ13 to γ17, 0, 1 and 2 are assigned as Local ID of the base station sectors γ18 to γ20, respectively, and 3, 5, 6, 7, 8 and 7 are assigned as the number of signals of the base station sectors γ13 to γ18 by the signal number calculation module 5 (or the required signal calculation module 4), respectively. Note that, it is assumed that a divided signal table made up of signals with the signal ID of 1 to 20 is selected for the base station sector γ18 by the divided signal table selection module 6.

The signal sequence allocation module 7 calculates a separation distance D4 between the base station sector γ18 and the base station sector γ17 to which the same Local ID 0 as the base station sector γ18 is assigned (for example, the shortest distance of a straight line connecting points within the respective sector forms of the base station sectors γ18 and γ17 in FIG. 17(a)). Note that the sector form indicates a service area. It is assumed that a predetermined value (for example, 5 km) of the separation distance D4 cannot be assured in the signal sequence allocation module 7. It is also assumed that the signal sequence allocation module 7 calculates a separation distance D5 between the base station sector γ18 and the base station sector γ15 to which the same Local ID 0 as the base station sector γ18 is assigned, and a predetermined value (for example, 5 km) of the separation distance D5 cannot be assured in the signal sequence allocation module 7. In this case, the signal sequence allocation module 7 needs to allocate a signal sequence containing signals different from the signals contained in the signal sequences allocated to the base station sector γ17 and the base station sectors γ15. In other words, the signal sequence allocation module 7 needs to allocate a signal sequence containing seven signals with the signal ID of 15 or later to the base station sector γ18. However, the signal IDs contained in the divided signal table selected for the base station sector γ18 are 1 to 20, and therefore the signal sequence allocation module 7 can allocate only six signal IDs 15 to 20.

In this case, the signal sequence allocation module 7 changes Local ID of any one base station sector of the base station sectors for which a separation distance from the base station sector γ18 cannot be ensured into Local IDD that does not overlap with Local ID of adjacent base station sectors within the same base station as the base station sector as much as possible. Then, the signal sequence allocation module 7 allocates signal sequences again to all base station sectors in the base station including the base station sector whose Local ID has been changed. Note that the signal sequence allocation module 7 may allocate signal sequences again only to base station sectors that affect the base station sector whose Local ID has been changed, rather than allocating signal sequences again to all base station sectors.

Specifically, as shown in FIG. 17(b), the signal sequence allocation module 7 changes Local ID of the base station sector γ15 for which a separation distance from the base station sector γ18 cannot be maintained into 2, which does not overlap with 1, Local ID of the adjacent base station sectors γ14 and γ16. Then, the signal sequence allocation module 7 allocates signal sequences again to the base station sector γ15 and the base station sector γ13 to which the same Local ID as the base station sector γ15 is assigned and thereby allocates a signal sequence composed of signals with the signal ID of 1 to 6 to the base station sector γ15 and allocates a signal sequence composed of signals with the signal ID of 9 to 11 to the base station sector γ13.

By the changing of Local ID and the re-allocation of signal sequences in the base station P described above, the signal sequence allocation module 7 can allocate seven signals among signal IDs 9 to 20 to the base station sector γ18 based only on the separation distance D4. Thus, the signal sequence allocation module 7 allocates a signal sequence composed of signals with the signal ID of 9 to 15 to the base station sector γ18. Note that, although adjustment related to a separation distance is made at the time of newly allocating signal sequences to base station sectors, adjustment related to a separation distance may be made to each base station sector after allocating signal sequences to all base station sectors once without making any adjustment related to a separation distance.

In the re-allocation of signal sequences as described above, Local ID is changed in some base station sectors. Typically, it is necessary to maintain a separation distance between base station sectors to which the same Local ID is assigned (which is referred to hereinafter as Local ID separation distance). In other words, consideration to maintain a separation distance between base station sectors in which the timing to transmit a signal sequence to a base station is the same and to which a signal sequence containing at least one of the same signals as signals in the signal sequence is allocated (which is referred to hereinafter as signal sequence separation distance) is required and consideration to maintain the Local ID separation distance is also required at the same time.

In the case where the Local ID separation distance cannot be maintained, it only results in deterioration of downlink communication quality. On the other hand, if the signal sequence separation distance cannot be maintained, it results in reduction of the cell radius, which causes a failure to maintain a sufficient base station area. Therefore, in terms of operation, maintaining the signal sequence separation distance has priority over maintaining the Local ID separation distance, for example. Note that, in general, the Local ID separation distance to be maintained is 1 km, for example, and the signal sequence separation distance to be maintained is 5 km, for example.

Figure 12:
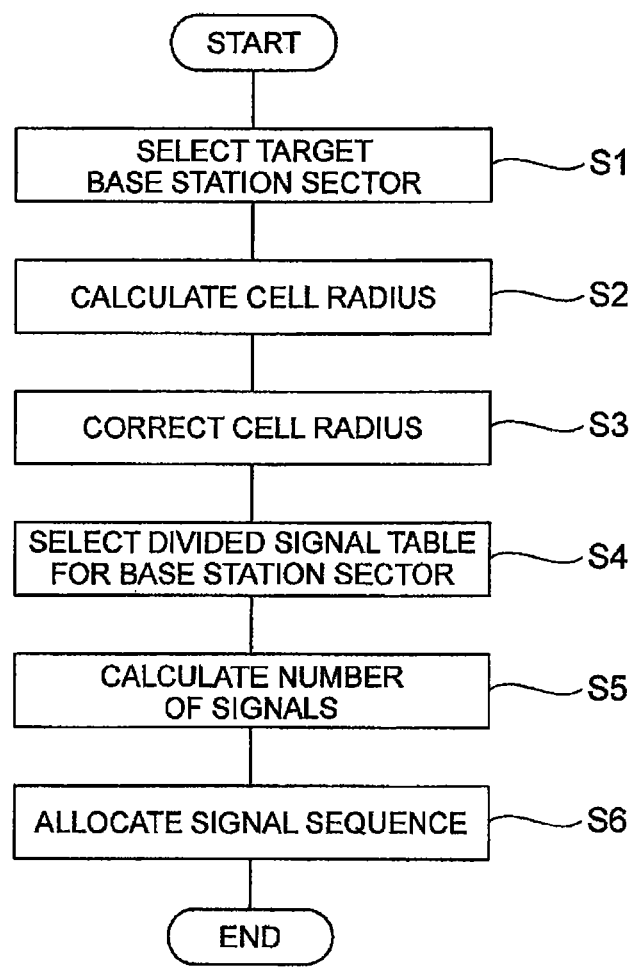
FIG. 12 is a flowchart showing a process of the signal sequence allocating device 1.

The process of the signal sequence allocating device 1 having the above configuration is described hereinafter. FIG. 12 is a flowchart showing the process of the signal sequence allocating device 1.

First, the signal sequence allocating device 1 selects a base station sector (target base station sector) to which a signal sequence is to be allocated (S1). Next, in the signal sequence allocating device 1, the cell radius calculation module 2 calculates the cell radius of the target base station sector (S2, area radius calculation step). Then, the cell radius correction module 3 included in the cell radius calculation module 2 corrects the cell radius (S3). Further, the divided signal table selection module 6 included in the required signal calculation module 4 selects a divided signal table for the target base station sector (S4).

Then, the signal number calculation module 5 included in the required signal calculation module 4 calculates the number of signals of the target base station sector based on the corrected cell radius (S5, signal number calculation step). After that, the signal sequence allocation module 7 allocates a signal sequence to the target base station sector based on the divided signal table selected for the target base station sector and the number of signals (S6, signal sequence allocation step). The procedure of S1 to S6 is repeatedly applied to all base station sectors to which signal sequences are to be allocated.

Figure 13:
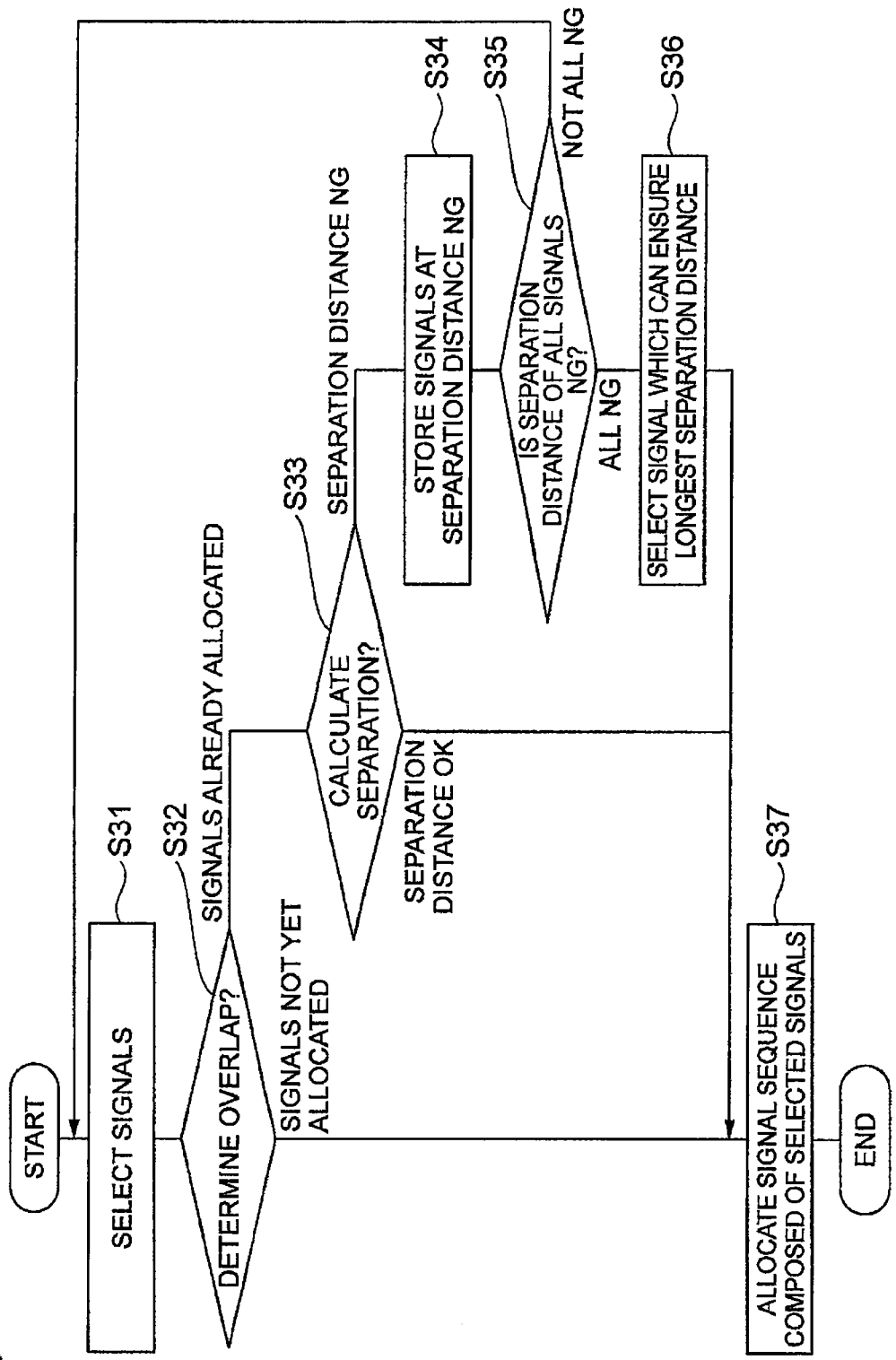
FIG. 13 is a flowchart showing a process to maintain a separation distance of the signal sequence allocation module 7.

An example of the detail of processing in S6 is described hereinafter with reference to FIG. 13. FIG. 13 is a flowchart showing a process to maintain a separation distance of the signal sequence allocation module 7 included in the signal sequence allocating device 1. In the following description, the process proceeds from S5 to S31 which is described below, instead of S6 which is described above.

First, in the signal sequence allocating device 1, the signal sequence allocation module 7 selects signals that form the divided signal table selected for the target base station sector in S4, corresponding to the number of signals calculated in S5 (S31). Next, the signal sequence allocation module 7 determines overlap as to whether the same signal is allocated to another base station sector (S32).

When, in S32, the signal is not allocated to any other base station sectors, the signal sequence allocation module 7 allocates a signal sequence composed of the selected signals to the target base station sector (S37). When, in S32, the signal is allocated to another base station sector (allocated base station sector), the signal sequence allocation module 7 calculates the separation distance between the target base station sector and the allocated base station sector (S33). When, in S33, the separation distance is maintained, the process proceeds to S37. When in S33, the separation distance cannot be maintained, the signal sequence allocation module 7 stores the signals for which the separation distance cannot be maintained into the signal sequence management module 11 (S34).

Then, the signal sequence allocation module 7 determines whether the separation distance cannot be maintained for all signals forming the divided signal table (S35). When the separation distance can be maintained for some signals, the process returns to S31 and performs the same procedure for the some signals. When, in S35, the separation distance cannot be maintained for all signals forming the divided signal table, the signal sequence allocation module 7 selects signals that can maintain the longest separation distance among those signals (S36) and then the process proceeds to S37.

The advantageous effects of the signal sequence allocating device 1 that performs the above process are described hereinbelow.

The cell radius calculation module 2, the signal number calculation module 5 (or the required signal calculation module 4) and the signal sequence allocation module 7 calculate the area radius of an area to which a signal sequence is to be allocated among areas in a base station sector, calculate the number of signals in the signal sequence to be allocated to the base station sector based on the calculated area radius, and allocates the signal sequence to the base station sector based on the calculated number of signals. It is thereby possible to efficiently and appropriately allocate the minimum required signal sequence to the area to which the signal sequence is to be allocated without excessively allocating signal sequences.

Further, the cell radius correction module 3 can calculate the cell radius close to the service area where radio waves actually reach by calculating the area radius based on the height of an antenna that transmits radio waves from a base station and the transmitting direction of the radio waves. Alternatively, the cell radius correction module 3 can calculate the cell radius close to the service area where radio waves actually reach by calculating the area radius in consideration also of the propagation delay between a base station and an antenna that transmits radio waves from the base station. Note that a specific example that causes the propagation delay is a distance, for example. Alternatively, the cell radius correction module 3 can calculate the cell radius close to the service area where radio waves actually reach by calculating the area radius based on the amount of delay in a radio amplification device that relays and amplifies radio waves from a base station and the degree of amplification of radio waves. Then, by calculating the number of signals based on the cell radius and allocating a signal sequence, it is possible to efficiently and appropriately allocate the minimum required signal sequence to the base station sector.

Further, the divided signal table selection module 6 can allocate different divided signal tables (for example, Table 1 and Table 2 in FIG. 9) to different base station sectors, thereby allowing more flexible allocation of signal sequences. Furthermore, the divided signal table selection module 6 selects, for a boundary area, a divided signal table different from that of an adjacent boundary area of another management body, such as the boundary sector A1 and the boundary sector B1 in FIG. 10, and it is thereby possible to efficiently and appropriately allocate the minimum required signal sequence to the base station sector in consideration of interference with the coverage managed by another management body. In addition, the divided signal table selection module 6 selects a divided signal table different from that for a peripheral base station sector, thereby avoiding interference from peripheral signal sequences and eliminating the effect on connection quality. It is thereby possible to efficiently and appropriately allocate the minimum required signal sequence to the base station sector in consideration of interference with peripheral signal sequences.

Further, the signal sequence allocation module 7 sequentially allocates signal sequences to base station sectors in ascending order of distance from a given base point as shown in FIG. 11, thereby avoiding overlap of signals with peripheral base station sectors. Furthermore, the signal sequence allocation module 7 allocates signal sequences as shown in the flowchart of FIG. 13, and it is thereby possible to efficiently and appropriately allocate signal sequences in a repeated manner so that there is no overlap of signals with peripheral signal sequences and a separation distance is maintained as long as possible from a base station sector to which the same signal is allocated.

Further, in the case where synchronization is made between base station sectors within the same base station among a plurality of base station sectors of a base station or even between different base stations, the signal sequence allocation module 7 allocates signal sequences containing overlapping signals to the base station sectors where the assigned Local ID is different. In such a case, because the timing to transmit a signal sequence to a base station differs (does not collide) in the base station sectors, a mobile station can make a communication connection even when signal sequences containing overlapping signals are allocated. It is thereby possible to efficiently and appropriately allocate the minimum required signal sequence to the area to which the signal sequence is to be allocated without excessively allocating signal sequences.

Further, the signal sequence allocation module 7 assigns signal sequences containing the same signals to base station sectors where the assigned Local ID is different and the number of signals calculated by the signal number calculation module 5 is the same among a plurality of base station sectors of a base station. It is thereby possible to efficiently and appropriately allocate the minimum required signal sequence to the area to which the signal sequence is to be allocated without excessively allocating signal sequences.

Further, the signal sequence allocation module 7 allocates signal sequences to base station sectors in descending order of the number of signals calculated by the signal number calculation module 5 among the base stations. The process to allocate signal sequences containing overlapping signals to base station sectors where the assigned Local ID is different among a plurality of base station sectors of a base station thereby becomes more concrete, thus allowing repeated allocation of signal sequences.

Further, at the time of allocating a signal sequence to one base station sector, the signal sequence allocation module 7 allocates a signal sequence that can maintain a separation distance between one base station sector and another base station sector with the same Local ID as that assigned to one base station sector and to which a signal sequence containing at least one of the same signals as signals in the signal sequence is allocated. It is thereby possible to repeatedly allocate signal sequences so that there is no overlap of signals between base station sectors to which the same Local ID is assigned or that the separation distance is maintained as long as possible from a base station sector to which the same Local ID is assigned and the same signal is allocated.

Further, when a signal sequence that can maintain a separation distance is not allocable to one base station sector, the signal sequence allocation module 7 changes Local ID of another base station sector into a different Local ID. It is thereby possible to repeatedly allocate signal sequences so that there is no overlap of signals between base station sectors to which the same Local ID is assigned or that the separation distance is maintained as long as possible from a base station sector to which the same Local ID is assigned and the same signal is allocated.

Note that, although the signal sequence allocation module 7 allocates, to a base station sector, signals contained in the divided signal table selected for the base station sector by the divided signal table selection module 6 in this embodiment, it is not limited thereto. For example, when predetermined conditions are satisfied, a signal sequence composed of signals contained in another divided signal table may be allocated.

Further, although signal sequences are allocated in a sequential order to base station sectors in this embodiment, it is not limited thereto. For example, when allocating a signal sequence to another base station sector B after allocating a signal sequence to a certain base station sector A, the signal sequence (which has been already allocated) of the base station sector A can be re-allocated to another signal sequence in light of maintaining a separation distance. In this manner, by re-allocating an already allocated signal sequence, it is possible to allocate a signal sequence more efficiently and appropriately.

REFERENCE SIGNS LIST

1 . . . signal sequence allocating device 1, 2 . . . cell radius calculation module 2, 3 . . . cell radius correction module 3, 4 . . . required signal calculation module 4, 5 . . . signal number calculation module 5, 6 . . . divided signal table selection module 6, 7 . . . signal sequence allocation module 7, 8 . . . configuration database management module 8, 9 . . . base station specifications management module 9, 10 . . . configuration parameter management module 10, 11 . . . signal sequence management module 11, 51 . . . CPU, 52 . . . RAM, 53 . . . ROM, 54 . . . input device, 55 . . . output device, 56 . . . communication module, 57 . . . auxiliary storage device

The invention claimed is:

1. A signal sequence allocating device for allocating a signal sequence composed of one or more signals to a plurality of communication areas of a base station in a mobile communication system, comprising:
   circuitry configured to
      calculate an area radius of an area in a communication area to which a signal sequence is to be allocated;
      select a first set of allocable signals for the communication area from a plurality of sets of allocable signals created by dividing a plurality of allocable signals into the plurality of sets of allocable signals;
      calculate a number of signals forming a signal sequence to be allocated to the communication area based on the area radius; and
      allocate a signal sequence to the communication area based on the calculated number of signals and the first set of allocable signals selected for the communication area.

2. A signal sequence allocating device for allocating a signal sequence composed of one or more signals to a plurality of communication areas of a base station in a mobile communication system, comprising:
   circuitry configured to
      calculate an area radius of an area in a communication area to which a signal sequence is to be allocated;
      select one divided signal table from a plurality of divided signal tables created by dividing a signal table containing allocable signals into two or more for each communication area;
      calculate a number of signals forming a signal sequence to be allocated to the communication area based on the area radius; and
      allocate a signal sequence to the communication area based on the divided signal table selected for the communication area and the calculated number of signals.

3. The signal sequence allocating device according to claim 2, wherein
   the circuitry is configured to select, for a boundary area being a communication area of a base station managed by one management area, adjacent to a communication area of a base station managed by another management body, a divided signal table composed of signals different from signals in a signal sequence allocated to the boundary area of the base station managed by another management body.

4. The signal sequence allocating device according to claim 2, wherein
   the circuitry is configured to select, for a predetermined communication area, a divided signal table different from that for peripheral communication areas.

5. The signal sequence allocating device according to claim 1, wherein
   the circuitry is configured to calculate the area radius based on a height of an antenna that transmits radio waves from a base station and a transmission direction of the radio waves.

6. The signal sequence allocating device according to claim 1, wherein
   the circuitry is configured to calculate the area radius based on propagation delay between a base station and an antenna that transmits radio waves from the base station.

7. The signal sequence allocating device according to claim 1, wherein
   the circuitry is configured to calculate the area radius based on an amount of delay in a radio amplification device that relays and amplifies radio waves from a base station.

8. The signal sequence allocating device according to claim 1, wherein
the circuitry is configured to calculate the area radius based on a degree of amplification of radio waves in a radio amplification device that relays and amplifies radio waves from a base station.

9. The signal sequence allocating device according to claim 1, wherein
the circuitry is configured to sequentially allocate signal sequences to communication areas in ascending order of distance from a given base point.

10. A signal sequence allocating device for allocating a signal sequence composed of one or more signals to a plurality of communication areas of a base station in a mobile communication system, comprising
circuitry configured to
calculate an area radius of an area in a communication area to which a signal sequence is to be allocated;
calculate a number of signals forming a signal sequence to be allocated to the communication area based on the area radius; and
allocate a signal sequence to the communication area based on the calculated number of signals, wherein
when allocating a signal sequence to a communication area, the circuitry is configured to allocate a signal sequence that maintains a separation distance between the communication area and another communication area to which a signal sequence containing at least one of same signals as signals in the signal sequence is allocated, and, when a predetermined separation distance is not maintained for all of allocable signals, allocate a signal sequence composed of signals that maintain a longest separation distance.

11. A signal sequence allocating method comprising:
calculating an area radius of an area in a communication area to which a signal sequence is to be allocated by a signal sequence allocating device for allocating a signal sequence composed of one or more signals to a plurality of communication areas of a base station in a mobile communication system;
selecting a first set of allocable signals for the communication area from a plurality of sets of allocable signals created by dividing a plurality of allocable signals into the plurality of sets of allocable signals;
calculating the number of signals forming a signal sequence to be allocated to the communication area by the signal sequence allocating device based on the calculated area radius; and
allocating a signal sequence to a communication area by the signal sequence allocating device based on the calculated number of signals and the first set of allocable signals selected for the communication area.

12. The signal sequence allocating device according to claim 1, wherein
the circuitry is configured to allocate signal sequences containing overlapping signals to a plurality of communication areas of a base station where timing to transmit a signal sequence to the base station is different.

13. The signal sequence allocating device according to claim 12, wherein
the circuitry is configured to allocate signal sequences containing the same signals to a plurality of communication areas of a base station where timing to transmit a signal sequence to the base station is different and the calculated number of signals is the same.

14. The signal sequence allocating device according to claim 12, wherein
the circuitry is configured to allocate signal sequences to communication areas of the base station in descending order of the number of calculated signals.

15. The signal sequence allocating device according to claim 12, wherein
when allocating a signal sequence to one communication area, the circuitry is configured to allocate a signal sequence that maintains a separation distance between said one communication area and another communication area in which timing to transmit a signal sequence to a base station is the same as in said one communication area and to which a signal sequence containing at least one of same signals as signals in the signal sequence is allocated.

16. The signal sequence allocating device according to claim 15, wherein
when a signal sequence that maintains a separation distance is not allocable to said one communication area, the circuitry is configured to change transmission timing of a signal sequence to a base station in said another communication area into different transmission timing.

17. The signal sequence allocating device according to claim 1, wherein
the circuitry is configured to allocate signal sequences containing the same signals to a plurality of communication areas of a base station where timing to transmit a signal sequence to the base station is different and the number of calculated signals is the same.

18. The signal sequence allocating device according to claim 1, wherein
the circuitry is configured to allocate signal sequences to communication areas of the base station in descending order of the number of calculated signals.

19. The signal sequence allocating device according to claim 1, wherein
when allocating a signal sequence to one communication area, the circuitry is configured to allocate a signal sequence that maintains a separation distance between said one communication area and another communication area in which timing to transmit a signal sequence to a base station is the same as in said one communication area and to which a signal sequence containing at least one of same signals as signals in the signal sequence is allocated.

* * * * *